US009663366B2

(12) United States Patent
Fox

(10) Patent No.: US 9,663,366 B2
(45) Date of Patent: May 30, 2017

(54) AMMONIA OXIDATION REACTOR WITH INTERNAL FILTER ELEMENT

(71) Applicant: BASF SE, Ludwigshafen (DE)

(72) Inventor: Robert A. Fox, Lake Jackson, TX (US)

(73) Assignee: BASF SE, Ludwigshafen (DE)

( * ) Notice: Subject to any disclaimer, the term of this patent is extended or adjusted under 35 U.S.C. 154(b) by 308 days.

(21) Appl. No.: 14/383,018

(22) PCT Filed: Feb. 22, 2013

(86) PCT No.: PCT/US2013/027367
§ 371 (c)(1),
(2) Date: Sep. 4, 2014

(87) PCT Pub. No.: WO2013/133992
PCT Pub. Date: Sep. 12, 2013

(65) Prior Publication Data
US 2015/0030521 A1    Jan. 29, 2015

Related U.S. Application Data

(60) Provisional application No. 61/606,651, filed on Mar. 5, 2012.

(51) Int. Cl.
C01B 21/26    (2006.01)
C01B 21/28    (2006.01)
(Continued)

(52) U.S. Cl.
CPC ............. *C01B 21/267* (2013.01); *B01J 8/006* (2013.01); *B01J 8/02* (2013.01); *B01J 8/025* (2013.01);
(Continued)

(58) Field of Classification Search
None
See application file for complete search history.

(56) References Cited

U.S. PATENT DOCUMENTS 2,185,607 A * 1/1940 Richardson ............. C01B 21/26
422/198
2,192,816 A    3/1940 Laury et al.
(Continued)

FOREIGN PATENT DOCUMENTS

CN    101809256 A    8/2010
CN    102084096 A    6/2011
(Continued)

OTHER PUBLICATIONS

International Search Report for Application No. PCT/US2013/027367 dated Jul. 4, 2013, 4 pages.
(Continued)

*Primary Examiner* — Wayne Langel
(74) *Attorney, Agent, or Firm* — Howard & Howard Attorneys PLLC

(57) ABSTRACT

A reaction vessel for oxidation of ammonia to nitrogen monoxide in the presence of a catalyst is provided. The catalyst can become dislodged during the oxidation. The reaction vessel includes a reactor body having a top portion, a bottom portion, and a middle portion. The top and middle portions cooperate to define a cavity where the ammonia is catalytically oxidized to provide the nitrogen monoxide. The reaction vessel also includes an internal filter element. The internal filter element includes a filter cage that defines an interior volume and a filter medium disposed adjacent to the filter cage. The internal filter element collects the catalyst dislodged during the oxidation.

13 Claims, 4 Drawing Sheets

(51) Int. Cl.
*B01J 8/02* (2006.01)
*B01J 12/00* (2006.01)
*B01J 8/00* (2006.01)

(52) U.S. Cl.
CPC ........... *B01J 8/0285* (2013.01); *B01J 12/007* (2013.01); *C01B 21/28* (2013.01); *B01J 2208/00203* (2013.01); *B01J 2208/027* (2013.01); *B01J 2219/00024* (2013.01)

(56) References Cited

U.S. PATENT DOCUMENTS

| | | | | |
|---|---|---|---|---|
| 2,226,113 | A * | 12/1940 | Chastain, Jr. | B01J 23/40 423/392 |
| 2,226,149 | A * | 12/1940 | Zimmermann | B01J 23/40 422/198 |
| 2,920,953 | A | 1/1960 | Rudorfer | |
| 3,057,138 | A | 10/1962 | Huxster | |
| 3,506,396 | A * | 4/1970 | Van Dijk | C01B 21/26 423/392 |
| 3,627,497 | A * | 12/1971 | Klein | C01B 21/28 422/211 |
| 3,954,449 | A | 5/1976 | Rudorfer et al. | |
| 4,189,405 | A * | 2/1980 | Knapton | B01J 23/08 423/213.5 |
| 4,412,859 | A * | 11/1983 | Hatfield | C22B 7/009 245/2 |
| 4,511,539 | A * | 4/1985 | Stephenson | C22B 7/009 422/211 |
| 4,774,069 | A | 9/1988 | Handley | |
| 4,788,004 | A | 11/1988 | Pinto et al. | |
| 5,256,387 | A * | 10/1993 | Campbell | B01J 23/8913 423/392 |
| 5,266,293 | A * | 11/1993 | Fairey | C01B 21/265 423/403 |
| 5,401,483 | A | 3/1995 | Ostroff | |
| 5,690,836 | A | 11/1997 | Raskin et al. | |
| 6,165,435 | A | 12/2000 | Echegaray et al. | |
| 7,011,807 | B2 * | 3/2006 | Zhou | H01M 4/921 208/108 |
| 8,381,512 | B2 | 2/2013 | Brinkman et al. | |
| 8,394,332 | B2 | 3/2013 | Honda et al. | |
| 2002/0127932 | A1 | 9/2002 | Neumann et al. | |
| 2007/0031310 | A1 | 2/2007 | Lee | |

FOREIGN PATENT DOCUMENTS

| | | |
|---|---|---|
| JP | H08-40710 A | 2/1996 |
| JP | 2004-528159 A | 9/2004 |
| WO | WO 91/10496 A1 | 7/1991 |
| WO | WO 03/078054 A1 | 9/2003 |
| WO | WO 2010/046675 A1 | 4/2010 |
| WO | WO 2010/046676 A1 | 4/2010 |

OTHER PUBLICATIONS

Heywood, A.E., "Partners in Profitability", Nitrogen+Syngas 290, British Sulphur Publishing, London, Nov.-Dec. 2007, pp. 44-50, XP001513467, ISSN: 1750-6891.
English language abstract for CN 101809256 extracted from espacenet.com database on Dec. 2, 2015, 1 page.
English language abstract for CN 102084096 extracted from espacenet.com database on Dec. 2, 2015, 2 pages.
English language abstract and machine-assisted English translation for JPH 08-40710 extracted from espacenet.com database on Mar. 15, 2017, 14 pages.
English language abstract not found for JP 2004-528159; however, see English language equivalent U.S 2002/0127932. Original document extracted from espacenet.com database on Mar. 15, 2017, 33 pages.

* cited by examiner

US 9,663,366 B2

AMMONIA OXIDATION REACTOR WITH INTERNAL FILTER ELEMENT

RELATED APPLICATIONS

This application is the National Stage of International Patent Application No. PCT/US2013/027367, filed on Feb. 22, 2013, which claims priority to and all the advantages of U.S. Provisional Patent Application No. 61/606,651, filed on Mar. 5, 2012, the content of which is incorporated herein by reference.

FIELD OF THE INVENTION

The present disclosure provides a reaction vessel for oxidation of ammonia to nitrogen monoxide in the presence of a catalyst. More specifically, the present disclosure provides a reaction vessel having an internal filter element which collects the catalyst dislodged during the oxidation of ammonia to nitrogen monoxide.

BACKGROUND OF THE INVENTION

Nitric acid is used for manufacturing nitrogen fertilizers and organic fertilizers, in the form of ammonium nitrate, potassium nitrate, or nitro phosphate. Nitric acid is also used in explosives, the plastics industry, and the chemical industry.

Nitric acid ($HNO_3$) is manufactured by catalytic combustion of ammonia to produce nitrogen monoxide. The process is typically conducted in three steps. The first step is oxidation of ammonia. The oxidation of ammonia takes place in the presence of a catalyst with yields ranging from 93-98% depending on the operating conditions used.

The second step is the condensation of the water of combustion and oxidation of the nitrogen monoxide. The second step may yield nitrogen dioxide, nitrogen tetroxide, or a mixture of the two. The third step involves the absorption or fixation of the nitrogen dioxide and nitrogen tetroxide. The reaction intermediates and products of the first and second steps may be commercially viable in their own right. Thus, the first and second steps may be used to form various products, even if nitric acid is not desired.

The catalyst used in the first step of the ammonia oxidation process is generally in the form of precious metal gauze. Because of the high temperatures that result from the oxidation of ammonia, the precious metal gauze often fractionates and particles thereof become entrained in the gaseous material present in the reaction vessel. This "metal loss" generally increases with the severity of reaction conditions. For example, the amount of metal loss generally increases as the temperature and the rate of production increases.

This metal loss has a substantial monetary impact on the economic feasibility of the ammonia oxidation process due to the high cost of the precious metal gauze. Furthermore, the metal loss may result in the poisoning of downstream catalytic material utilized in subsequent reaction vessels which are downstream of the ammonia oxidation reactor.

One solution to the problem of metal loss has been to provide an external filter housing and filtration device downstream from the ammonia oxidation reaction vessel. These external filter housing configurations cause pressure drop and require additional space in an already crowded plant facility. Another solution has been the use of fibrous material in a location immediately adjacent to the precious metal gauze. Unfortunately, the use of such fibrous materials in this location does not achieve efficient filtration and requires a confined space entry procedure in order to service the fibrous material during the requisite periodic maintenance.

SUMMARY OF THE DISCLOSURE AND ADVANTAGES

A reaction vessel for oxidation of ammonia to nitrogen monoxide in the presence of a catalyst is provided. The catalyst can become dislodged during the oxidation. The reaction vessel includes a reactor body having a top portion, a bottom portion, and a middle portion. The top and middle portions cooperate to define a cavity where the ammonia is catalytically oxidized to provide the nitrogen monoxide. The internal filter element includes a filter cage defining an interior volume and a filter medium disposed about the filter cage. The internal filter element collects the catalyst dislodged during the oxidation of ammonia.

Various embodiments of the present disclosure provide a compact design which allows seamless integration with existing reaction vessel designs. Because the internal filter element is disposed within the reaction vessel, precious space is saved, and efficiency is gained. Embodiments of the present disclosure also achieve improved filtration, which leads to improved cost recovery and less poisoning of downstream catalysts. Embodiments of the present disclosure allow servicing of the reaction vessel without a confined space entry procedure.

BRIEF DESCRIPTION OF THE DRAWINGS

For understanding the nature and objects of the invention, reference should be had to the following detailed description taken in connection with the accompanying drawings.

DETAILED DESCRIPTION OF THE INVENTION

Figure 1:
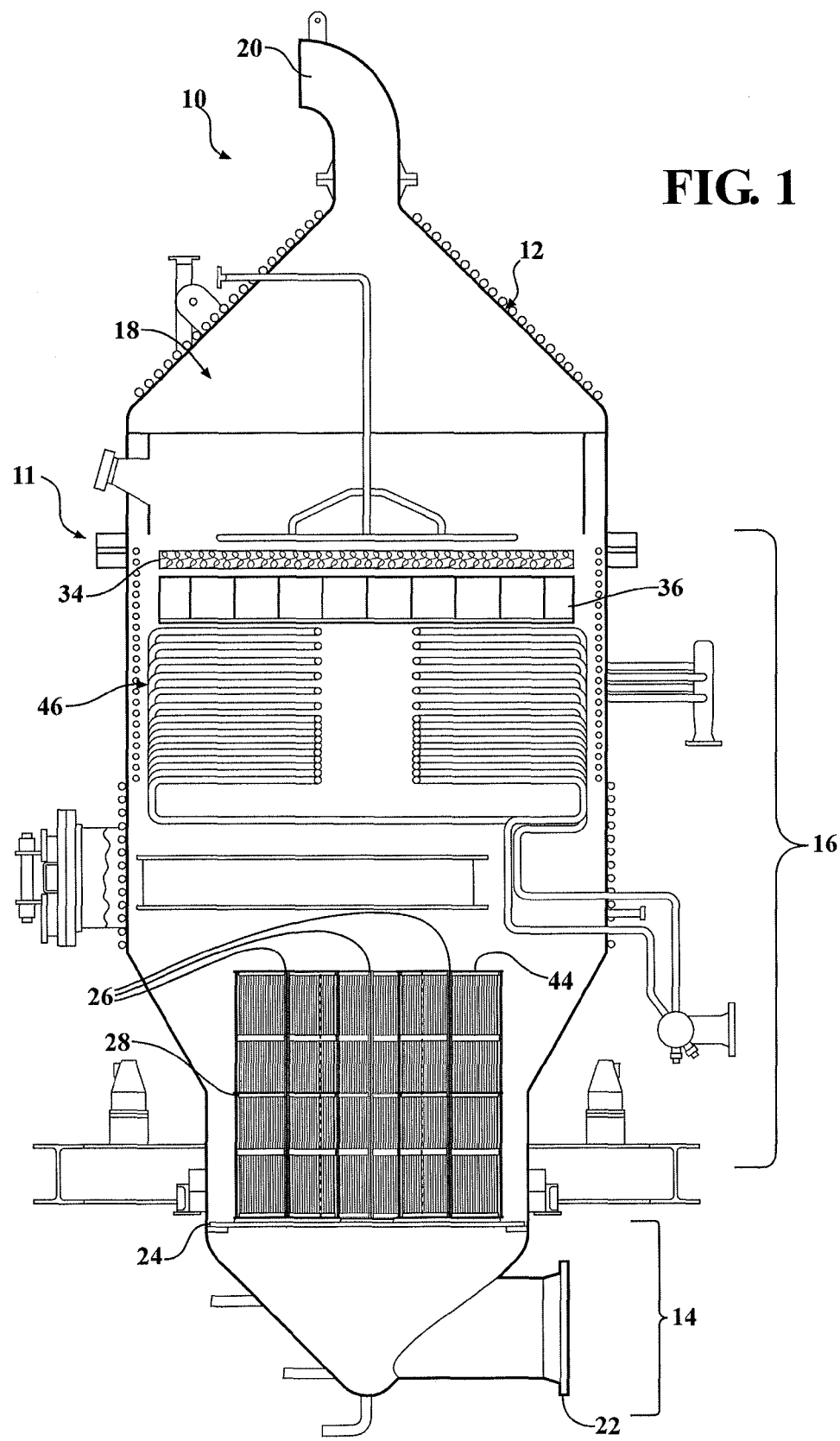
FIG. 1 is a cut-away view of a reaction vessel for oxidation of ammonia in accordance with one embodiment of the invention.

A reaction vessel 10 for oxidation of ammonia to nitrogen monoxide in the presence of a catalyst is provided. Referring to FIG. 1, the reaction vessel 10 comprises a reactor body 11 having a top portion 12, a bottom portion 14, and a middle portion 16. Typically, the reaction vessel 10 is generally cylindrical. However, the reaction vessel 10 may be other shapes as well. The top portion 12 and the bottom portion 14 are generally domed, but may have other shapes and configurations. A flanged joint may join the top portion 12 and the middle portion 16 together. In addition, a flanged joint may join the middle portion 16 and the bottom portion 14 together. In another embodiment, the reaction vessel 10 may have the top portion 12 and the middle portion 16 integrated together with no discrete joints. The bottom portion 14 of the reaction vessel 10 should be easily removable from the reaction vessel 10 to allow for easy access and maintenance of the reaction vessel 10. Therefore, the bottom portion 14 should be dimensioned and fastened with this consideration in mind.

The reaction vessel 10 may have a height ranging from 1 to 20 m, or from 2 to 10 m, or from 3 to 9 m. Alternatively, the reaction vessel 10 can have other heights suitable to process incoming ammonia. The reaction vessel 10 may have a diameter ranging from 1 to 5 m. Alternatively, the reaction vessel 10 can have other diameters suitable to process incoming ammonia.

The reaction vessel 10 may comprise materials capable of withstanding highly corrosive conditions and temperatures exceeding 900° C. For example, the reaction vessel 10 may comprise stainless steel. It is also contemplated that the reaction vessel 10 may be manufactured from other suitable materials which resist corrosion.

The reaction vessel 10 may have a similar design to an ammonia oxidation reactor, such as an Oschatz reactor. Other types of ammonia oxidation reactors may also be used in conjunction with this disclosure. Furthermore, it is also within the scope of this disclosure to modify conventional reactor designs in accordance with the ideas and concepts presented herein.

The bottom portion 14 may have a conical shape that defines an interior volume. The conical shape helps minimize the pressure drop as the filtered gas passes through the bottom portion 14. Alternatively, the bottom portion 14 may have other shapes and configurations that allow the efficient transfer of the filtered gas, such as cylindrical, semi-spherical, etc.

The top portion 12 and the middle portion 16 cooperate to define a cavity 18 where the ammonia is catalytically oxidized to provide nitrogen monoxide. The reaction vessel 10 may include at least one inlet 20 and at least one outlet 22. The inlet 20 is typically positioned in the top portion 12 of the reaction vessel 10, allowing material which passes through the inlet 20 to enter the cavity 18. The reaction vessel 10 may include multiple inlets 20. The inlet 20 may allow incoming air, vaporized ammonia, and other components to enter the cavity 18. The inlets 20 may comprise various fittings and connectors that allow the transfer of materials in an efficient manner. For example, the inlet 20 may include a plurality of nozzles or an alternative gas distribution system, such as a parallel plate gas distribution system used to distribute gas evenly in the reaction cavity 18.

The outlet 22 may be positioned in the bottom portion 14 of the reaction vessel 10, located below the filter plate 24. The outlet 22 allows the filtered gas to exit the reaction vessel 10. The outlet 22 may connect to various downstream unit operations for further processing.

The reaction vessel 10 also includes a filter plate 24 that extends across the reactor body 11 and divides the bottom portion 14 from the cavity 18. The filter plate 24 may have a shape and size that cooperates with the interior dimension of the reactor body 11, and thus prevents the catalyst loaded gas from bypassing the filter plate 24 without passing through an internal filter element 26. The filter plate 24 may have a cylindrical shape and be manufactured from a material suitable for the conditions present in the reaction vessel 10. For example, the filter plate 24 may comprise stainless steel. The filter plate 24 may comprise a solid material, such that gas may not pass through. However, as discussed below, the filter plate 24 may include various channels that allow for the deliberate passage of gas there through. The bottom portion 14 may be mounted to the reaction vessel 10 with a seal or gasket that prevents the catalyst loaded gas from passing between the cavity 18 and bottom portion 14 without first passing through the internal filter element 26. The seal or gasket may comprise materials that are capable of withstanding the corrosive and high temperature conditions of the reaction vessel. In one embodiment, the seal or gasket comprises metal, natural or synthetic rubber, or heat-resistant polymers.

In other words, in one embodiment, the filter plate 24 defines the upper-most area of the bottom portion 14, and thus divides the cavity 18 from the bottom portion 14. By "dividing the cavity 18 from the bottom portion 14", it is intended to mean a mechanical divide is created which prevents the catalyst loaded gas from passing between the cavity 18 and the bottom portion 14 without first passing through the internal filter element 26. Thus, the filter plate 24 channels the flow of catalyst loaded gas to the bottom portion.

The filter plate 24 is connected to bottom portion 14, such that as the bottom portion 14 is dropped from the reaction vessel 10, the filter plate 24 is lowered as well. The bottom portion 14 may be easily removed from the reaction vessel 10, thus allowing the filter plate 24, along with the internal filter element 26 to be easily serviced without the need for a confined space entry procedure.

Figure 2:
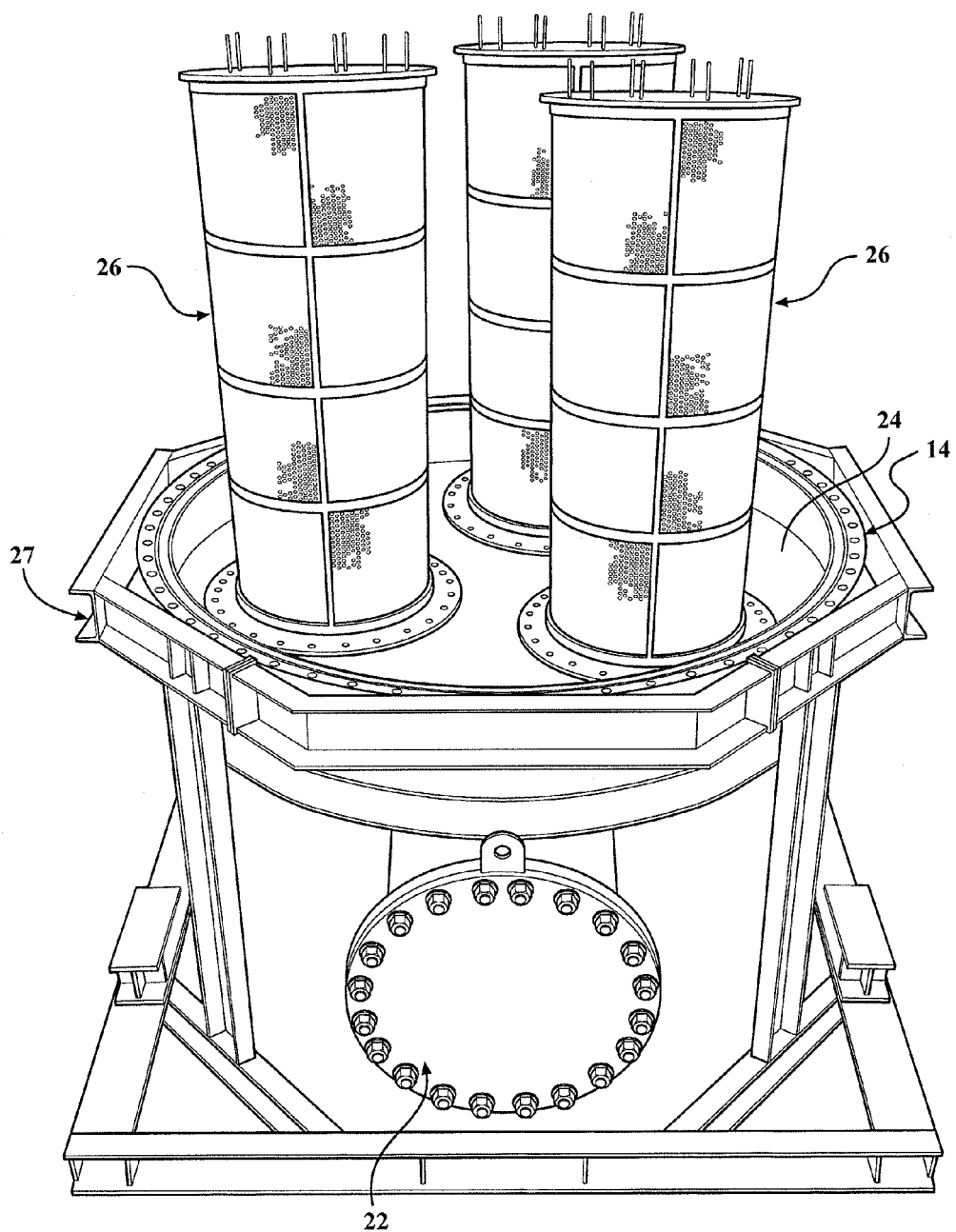
FIG. 2 is a perspective view of the removal frame supporting the bottom portion of the reaction vessel in accordance with one or more embodiments of the present invention.

Referring to FIG. 2, a removal frame 27 may be used to facilitate lowering of the bottom portion 14 from the reaction vessel 10. The removal frame 27 may comprise a plurality of differentia material that have sufficient strength to facilitate lowering of the bottom portion from the reaction vessel; for example, metal, wood, or plastic. The removal frame 27 may include a plurality of lateral supports to engage the bottom portion 14 and a vertical framework sufficient to keep the lower extremity of the bottom portion 14 from extending lower than the removal frame 27. In one embodiment, the removal frame 27 is configured to engage the bottom portion 14 of the reaction vessel 10 and support the weight thereof. A forklift or similar mechanism may be used to engage the removal frame 27 and lift the removal frame 27 to a height suitable to engage the bottom portion 14. Once the bottom portion 14 is engaged by the removal frame 27, the bottom portion 14 can be disconnected from the reaction vessel 10 and then the removal frame 27 can be lowered to remove the bottom portion 14 and the filter plate 24 from the reaction vessel 10. As the filter plate 24 is lowered with the bottom portion 14, the internal filter element 26 is also lowered, and is thus positioned at a location that allows for servicing of the internal filter element 26.

In another embodiment, the reaction vessel 10 includes the internal filter elements 26 mounted in an alternative configuration, other than on the filter plate 24. For example, the internal filter element 26 can be suspended in the cavity 18 from various support means, such as structural cross members, mounting brackets, or hanging cables. Alternatively, the internal filter element 26 can be supported on the bottom portion of the reaction vessel, without use of a filter plate 24. In such an embodiment, the internal filter element 26 typically comprises ceramic.

Referring to FIG. 2, the reaction vessel 10 may include the internal filter element 26 mounted on the filter plate 24. The internal filter element 26 collects the catalyst dislodged during the oxidation. The internal filter element 26 may be disposed on top of the filter plate 24 and attached or secured to the filter plate 24 in a variety of ways, such as with fasteners, flanges, adhesives, interlocking tabs, etc.

Referring again to FIG. 2, the filter plate 24 includes a number of outlet ports 32 at least equal to the number of internal filter elements 26 provided in the reaction vessel 10. Thus, if three internal filter elements 26 are provided, the filter plate 24 would include at least three outlet ports 32, such that the interior volume 38 of the internal filter element 26 is disposed above the outlet ports 32. The center of the internal filter elements 26 are typically aligned with the center of the outlet ports 32. The outlet ports 32 may have a dimension and shape complimentary with the dimensions of the internal filter elements 26, thus allowing the catalyst loaded gas to pass through the internal filter element 26 and into the interior volume 38, then pass through the outlet port(s) 32, and then enter the bottom portion 14 of the reaction vessel 10. For example, the outlet ports may be circular, elliptical, or polygonal.

The internal filter elements 26 may be sized to accommodate the amount of catalyst loaded gas that is being generated by the reaction vessel 10. In one specific embodiment, the internal filter element 26 comprises from 100 to 1000 sq. ft. of active filtering area. The internal filter element 26 may alternatively comprise from 300 to 600 sq. ft. of active filtering area, or from 400 to 500 sq. ft. of active filtering area. It is also contemplated that the internal filter element 26 may include other amounts of active filtering area not specifically enumerated.

The internal filter element 26 may have a height ranging from 0.2 to 2.5 meters. Alternatively, it is also contemplated that the internal filter element 26 may have a height ranging from 0.5 to 2 m, or from 0.7 to 1.5 m depending on the size of the reaction vessel 10 and cavity 18, as well as the amount of catalyst loaded gas to be processed by the internal filter element 26.

In one or more embodiments, the internal filter element 26 is further defined as a plurality of internal filter elements 26. In other words, the reaction vessel 10 may include more than one internal filter element 26. In one specific embodiment, the reaction vessel 10 may include from 1 to 10 internal filter elements 26. In another specific embodiment, the reaction vessel 10 may include from 2 to 5 internal filter elements 26.

If a single internal filter element 26 is utilized, it may be disposed in a variety of positions on the filter plate 24, such as being centrally positioned or being located in an offset position. Alternatively, if the plurality of internal filter elements 26 is being utilized, the plurality of internal filter elements can be arranged in a variety of patterns on the filter plate 24, or may be randomly positioned. In one embodiment, the plurality of internal filter elements 26 can be positioned in an equidistant arrangement or an alternative arrangement that allows efficient filtration of the catalyst loaded gas by the plurality of internal filter elements 26. For example, the plurality of filter elements 26 can be positioned in a symmetrical, star-shaped arrangement extending radially outward from the center of the filter plate 24.

Figure 3:
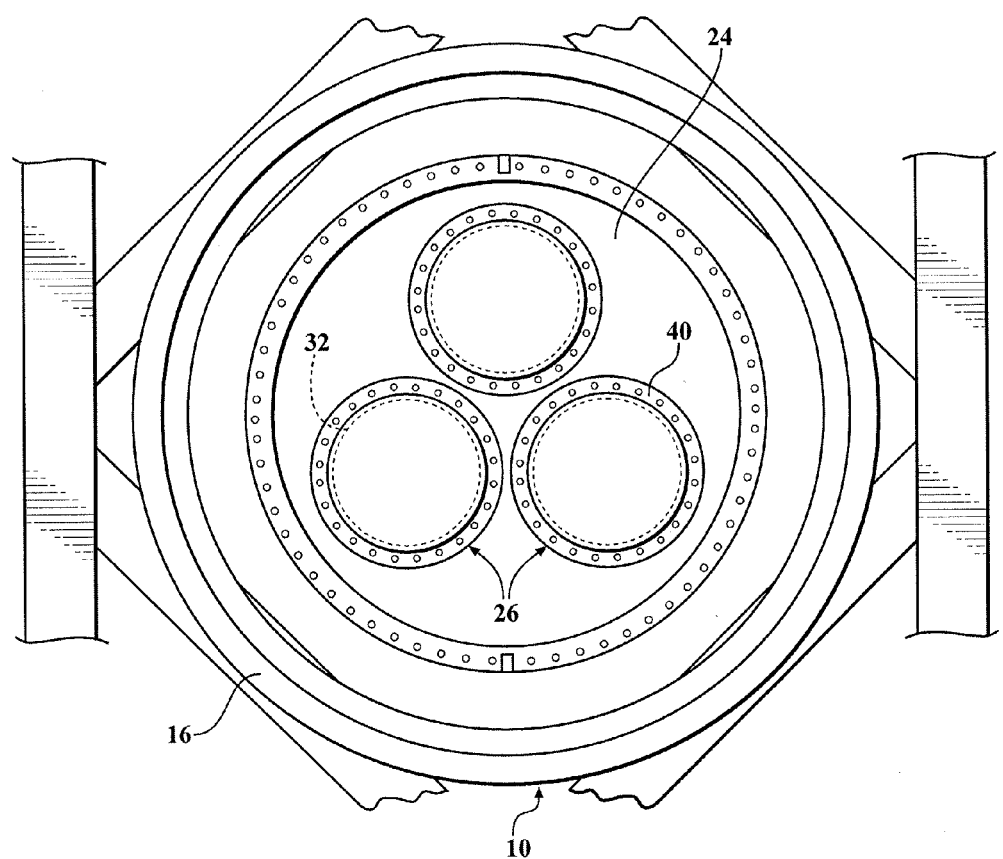
FIG. 3 is a top view of the interior of the reaction vessel and the internal filter elements of FIG. 1 in accordance with one or more embodiments.
Figure 4:
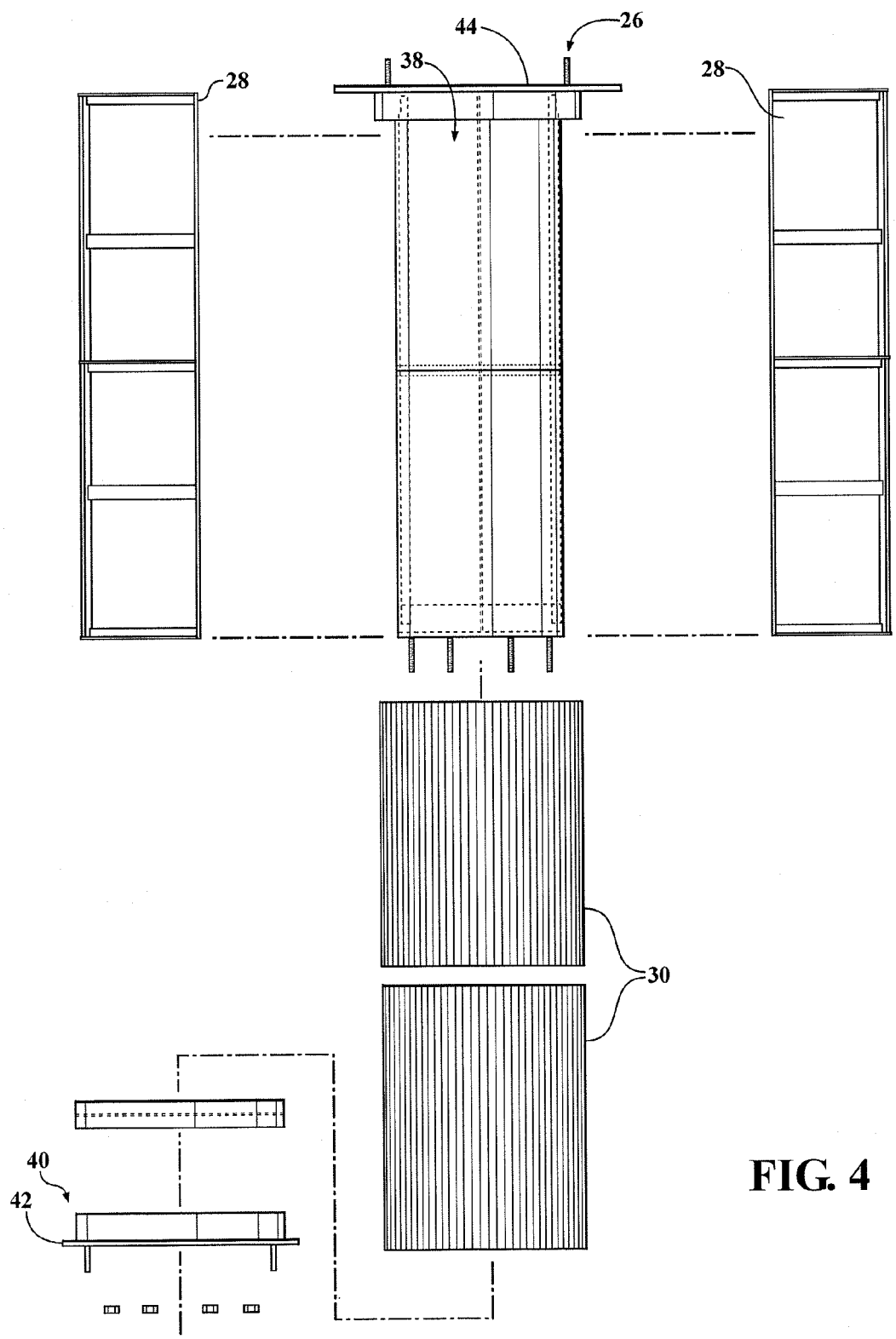
FIG. 4 is an exploded view of the internal filter element of FIG. 1 in accordance with one or more embodiments.

Referring to FIG. 3, in one embodiment, the internal filter element 26 comprises a filter cage 28 and a filter medium 30. The filter medium 30 can be structurally supported by the filter cage 28 or may contain sufficient internal or external structural rigidity such that no filter cage 28 is necessary.

Referring again to FIG. 1, the filter cage 28 protrudes upwardly from the filter plate 24 and defines the interior volume 38. By interior volume 38, it is meant to refer to the volume generally encompassed by the filter cage 28 and the filter medium 30.

The filter cage 28 may have a variety of shapes and configurations. In one embodiment, the filter cage 28 is cylindrically shaped. The filter cage 28 may comprise a wire cage that is structurally sufficient to support or secure the filter medium 30. The filter cage 28 may be designed to secure the filter medium 30. The filter cage 28 is also capable of resisting degradation as would typically result in a highly corrosive environment with temperatures over 300° C. and may comprise metallic or plastic materials having different size holes that allow the catalyst loaded gas to pass through the filter cage.

The filter medium 30 may be positioned adjacent to the filter cage 28. For example, the filter medium 30 can be internal, external, or intertwined with the filter cage 28, so long as adequate structural support is provided. In one specific embodiment, the filter medium 30 is disposed in the interior volume 38 of the filter cage 28. In another embodiment, the filter medium 30 is disposed on an auxiliary filter support and disposed in the interior volume 38 of the filter cage 28. If the filter medium 30 is provided external to the filter cage 28, the filter medium 30 may attached to the filter cage 28, such that the filter cage 28 provides structural support to the filter medium.

If the filter medium 30 is intertwined with the filter cage 28, at least a portion of the filter medium 30 may be disposed in the interior volume of the filter cage 28, and at least a portion of the filter medium 30 may be disposed exterior to the filter cage 28.

The filter medium 30 can be provided in distinct sections, such that several filter medium sections can be included in a single internal filter element 26. In one embodiment, the filter medium 30 sections can be stacked atop one another to form the internal filter element 26. If several filter medium sections are used, the individual sections may be divided by a seal ring that adjoins the filter medium sections and ensures that no catalyst loaded gas bypasses the filter medium 30. It is contemplated that the number of filter medium sections can range from 1 to 10 or from 2 to 5 in a single filter medium 30.

Many different filter mediums 30 may be sufficient for use with the reaction vessel 10 described herein, as long as they can provide adequate filtration without causing excessive pressure drop. The filter medium 30 must be also capable of withstanding a highly corrosive environment, with temperatures over 300° C. In one specific embodiment, the filter medium 30 comprises ceramic materials. The filter medium 30 may comprise ceramic fibers assembled and oriented in a manner where the filter medium 30 is capable of filtering out catalyst material as small as 0.1 microns.

In one or more configurations, the filter medium 30 may be pleated. However, a non-pleated filter medium 30 may also be suitable for use in the reaction vessel 10. The filter medium 30 may have an effective filter size ranging from 0.1 to 10 microns. Alternatively, the filter medium 30 may have an effective filter size ranging from 0.1 to 5, or from 0.1 to 3 microns. Effective filter size is intended to refer to the size of particles that can effectively and reliably be captured by the filter medium 30.

Referring to FIG. 3, the internal filter element 26 may further comprise a filter base 40 and a mounting gasket 42. The filter base 40 is disposed between the filter cage 28 and the filter plate 24 and connects the filter cage 28 to the filter plate 24. The mounting gasket 42 is disposed between the filter plate 24 and the filter base 40, directly or indirectly. The mounting gasket 42 forms a seal between the internal filter element 26 and the filter plate 24, thus ensuring that all of the catalyst loaded gas must pass through the internal filter element 26 in order to enter the bottom portion 14 of the reaction vessel 10, without leaking through the connection between the filter plate 24 and the internal filter element 26. The filter base 40 connects to the filter plate 24 with a flange or other suitable fastening system. The mounting gasket 42 can be manufactured from a variety of materials, as long as the materials can withstand a highly corrosive environment with temperatures over 300° C.; for example, natural or synthetic rubbers, metals, or high-temperature polymers.

The internal filter element 26 may also include a filter cap 44. The filter cap 44 may cooperate with the top of the internal filter element 26 and ensure that no catalyst loaded gas bypasses the filter medium 30 through the top of the internal filter element 36.

Referring again to FIG. 1, the cavity 18 may include a catalytic material 34. In one embodiment, the catalytic material 34 comprises catalytic gauze. In other configurations, the catalytic material 34 may take other configurations which provide adequate surface area to enable the incoming air and vaporized ammonia to contact the catalytic material 34, and lead to the oxidation of ammonia.

The catalytic material 34 is one which enables the catalytic oxidation of ammonia to nitrogen monoxide. As such, a variety of catalytic materials 34 may be utilized in conjunction with the reaction vessel 10 described herein. In one specific embodiment, the catalytic material 34 comprises platinum. Alternatively, the catalytic material 34 may comprise platinum, rhodium, palladium, and combinations thereof. Alternatively still, the catalyst material 34 may comprise other components suitable to enable the catalytic oxidation of ammonia.

The catalytic material 34 may be held in place within the cavity 18 by a supporting framework 36. The catalytic material 34 may be positioned in a variety of locations with the cavity 18. The supporting framework 36 may extend across the reaction vessel 18 to position the catalytic material 34 in an optimal location with respect to the incoming air and vaporized ammonia, such that the incoming air and vaporized ammonia at least partially contacts the catalytic material. The supporting framework 36 may comprise a simple girder support arrangement, a basket, cables, or other support systems.

As mentioned above, the reaction vessel 10 includes at least one inlet 20, which allows incoming air and vaporized ammonia to enter the cavity 18. The incoming air may be compressed and cooled before it is transferred to the cavity 18. The incoming air may enter the cavity 18 at a temperature ranging from 50 to 1000° C., from 100 to 500° C., or from 150 to 250° C.

The liquid ammonia is vaporized before it is transferred to the cavity 18 of the reaction vessel 10 for oxidation. The liquid ammonia may be vaporized by a heat exchanger, or alternative heating means.

The incoming air and vaporized ammonia are mixed thoroughly with the cavity 18, while simultaneously contacting the catalytic material 34. As mixing occurs in the presence of catalytic material, the oxidation of the vaporized ammonia may be almost instantaneous. The exothermic nature of the oxidation of ammonia can raise the temperature within the reaction vessel 10 to a temperature exceeding 900° C.

The middle portion 16 contains at least one heat removal device 46 used to remove heat from the catalyst loaded gas in the cavity 18 before the gas is filtered. Because the temperature of the catalyst loaded gas can exceed 900° C., the gases are typically cooled before they pass through the internal filter elements 26. The heat removal device 46 is typically positioned directly below the catalytic material 34 and above the internal filter elements 26. By "above the internal filter elements" it is intended to mean that at least a portion of the heat removal device 46 is at a higher relative elevation than the internal filter elements 26. It is to be appreciated that the heat removal device 46 can also be positioned such that the entire heat removal device 46 is above the top of the internal filter elements 26. As the hot catalyst loaded gas contacts the heat removal device 46, the hot catalyst loaded gas is cooled to a temperature ranging from 150° C. to 350° C., or approximately 200° C. before entering the internal filter elements 26.

In one embodiment, the heat removal device 46 comprises a plurality of heat removal coils as shown in FIG. 1. The plurality of heat removal coils may be arranged in a pancake orientation to maximize the heat transfer area of the heat removal device 46. The heat removal device 46 may be connected to a circulation mechanism to ensure optimal heat transfer rates. The heat captured with the heat removal device 46 can be recycled and used for various auxiliary processes, such as producing steam. The heat removal device may utilize a fluid as a heat transfer medium.

Further describing the reaction mentioned above, as the incoming air and vaporized ammonia contact the catalytic material 34, a nitrous gas is formed. The nitrous gas comprises nitrogen monoxide, water vapor, and residual nitrogen. It is also contemplated that the nitrous gas may include other components. After the nitrous gas is formed and the catalytic material 34 is entrained therein, the cooled catalyst loaded gas flows vertically downward through the cavity 18 toward the filter plate 24. As the cooled catalyst loaded gas reaches the filter plate 24, it is diverted such that the cooled catalyst loaded gas may not pass to the interior volume of the bottom portion 14 without first passing through the interior filter element 26. Thus, the cooled catalyst loaded gas passes through the internal filter element 26 and then into the bottom portion 14. As the cooled catalyst loaded gas passes through the internal filter element(s) 26, the entrained catalytic material is collected in filter medium 30 for later processing and recovery. The gas present in the bottom portion is substantially free from catalyst material, such as less than 10, 5, 3, 1, 0.5, 0.1, 0.01, or 0.001 wt. % catalyst material based on the total weight of the gas present in the bottom portion.

As mentioned above, after the cooled catalyst loaded gas passes through the internal filter element 26, a filtered gas is produced. In one possible embodiment, the filtered gas comprises nitrous gases and water vapor. The nitrous gases may comprise nitrogen monoxide, nitrogen dioxide, nitrogen, and various other nitrogen-containing compounds. The filtered gas may be passed through a series of coolers in order to remove the excess heat from the filtered gas to yield a hot, filtered gas. In certain embodiments, the filtered gas is transferred to a second reaction vessel for further processing.

In another embodiment, referring again to FIG. 1, a system for the oxidation of ammonia to produce nitric oxide and reduction of nitrogen dioxide is provided. The system includes a first reaction vessel 10 for the oxidation of ammonia as described above. The first reaction vessel 10 catalytically oxidizes ammonia to provide nitrogen monoxide. The first reaction vessel 10 also includes the internal filter element 26 comprising a filter medium 30 comprising ceramic, which is provided in the cavity 18. The system also includes a second reaction vessel for reduction of nitrogen dioxide. The second reaction vessel may have a variety of configurations and designs, as long as they are suitable to enable the reduction of nitrogen dioxide. The second reaction vessel is in fluid communication with and is downstream from the first reaction vessel 10. The second reaction vessel comprises a $NO_2$ reduction catalyst.

The NO$_2$ reduction catalyst may comprise silver in one or more embodiments. The silver may be in pure form (99 or 99.9 wt. % Ag) or alloy form. Alternatively, the NO$_2$ reduction catalyst may comprise other materials suitable for catalyzing the reduction reaction of nitric dioxide. Because the first reaction vessel 10 includes the internal filter element 26, catalytic material will not be transported downstream, and thus will not enter the second reaction vessel. Accordingly, the NO$_2$ reduction catalyst will not be substantially poisoned with the catalytic material from the first reaction vessel 10.

In order to recover the precious metals from the internal filter element 26, a variety of methods and equipment may be utilized. The internal filter element 26 can be removed from the reaction vessel 10 periodically and processed to collect the catalytic material. Once the internal filter elements 26 are removed from the reaction vessel 10, the filter medium 30 can be processed to remove the catalytic material accumulated therein. For example, the precious metals may be recovered from the filter medium 30 by evaporation, precipitation, filtration, mechanical separation, vacuum collection and other methods.

It is to be appreciated that this disclosure is not limited to the construction of new reactors. Existing reaction vessels can be retrofitted to include the internal filter element 26 by removing the existing bottom portion of such reaction vessels and attaching the bottom portion 16, filter plate 24, and the internal filter element 26 of the present disclosure to the reaction vessel. By including the internal filter elements 26, bottom portion 14, and filter plate 24, the retrofitted reaction vessel can efficiently filter the catalyst loaded gas. Furthermore, the retrofitted reaction vessel and internal filter elements 26 can be easily serviced without confined space entry procedures by lowering the bottom portion 14, and thus the filter plate 24 and the internal filter element 26 from the bottom of the retrofitted reaction vessel in a single integral piece. Once the bottom portion 14 is dropped from the reaction vessel 10, the filter medium 30 can be replaced.

A method of oxidizing ammonia to nitrogen monoxide in the presence of a catalyst is also provided. The catalyst can become dislodged during the oxidation. The method includes providing a reaction vessel comprising a reactor body. The reactor body comprises a top portion, a bottom portion, and a middle portion. The top and middle portions cooperate to define a cavity. The method also includes providing an internal filter element within the cavity and oxidizing ammonia in the presence of a catalyst in the cavity to form nitrogen monoxide. The method further includes internally filtering the catalyst dislodged during the step of oxidizing ammonia with the internal filter element and collecting the dislodged catalyst from the internal filter element.

In one or more embodiments, the method may also include the steps of disconnecting the bottom portion of the reactor body from the middle portion of the reactor body and lowering the bottom portion of the reactor body to a height sufficient to remove the internal filter element from the cavity. In certain embodiments, the step of collecting the dislodged catalyst from the internal filter element is performed after said step of lowering the bottom portion of the reactor body.

By internally filtering the catalyst, it is meant that the catalyst loaded gas is filtered without transporting the gas outside of the interior volume of the reaction vessel. Instead, the catalyst loaded gas is passed through the internal filter element, which is disposed within the cavity.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. It is intended that the invention not be limited to the particular embodiment disclosed as the best mode contemplated for carrying out this invention, but that the invention will include all embodiments falling within the scope of the appended claims.

What is claimed is:

1. A reaction vessel for oxidation of ammonia to nitrogen monoxide in the presence of a catalyst which can become dislodged during the oxidation, said reaction vessel comprising:
   a reactor body having a top portion, a bottom portion, and a middle portion,
      wherein said top and middle portions cooperate to define a cavity where the ammonia is catalytically oxidized to provide the nitrogen monoxide;
   a filter plate extending across said reactor body dividing said bottom portion from said cavity; and
   an internal filter element provided on said filter plate,
      wherein said internal filter element comprises a filter cage defining an interior volume and a filter medium disposed adjacent to said filter cage and protruding upwardly from said filter plate into said cavity, and
      wherein said internal filter element collects said catalyst dislodged during the oxidation.

2. The reaction vessel of claim 1 wherein said filter medium comprises ceramic.

3. The reaction vessel of claim 1 further comprising a heat removal device positioned in said cavity above said internal filter element.

4. The reaction vessel of claim 1 wherein said filter medium is disposed in said interior volume of said filter cage.

5. The reaction vessel of claim 1 wherein said internal filter element is further defined as a plurality of internal filter elements.

6. The reaction vessel of claim 1 wherein said internal filter element further comprises a filter base and a mounting gasket,
   wherein said filter base is disposed between said filter cage and said filter plate and connects said filter cage to said filter plate, and
   wherein said mounting gasket is disposed between said filter plate and said filter base.

7. The reaction vessel of claim 1 wherein said filter cage is cylindrically shaped.

8. The reaction vessel of claim 1 wherein a height of said reaction vessel ranges from 1 to 20 m and a height of said internal filter element ranges from 0.5 to 1.5 m.

9. The reaction vessel of claim 1 wherein said filter medium has an effective filter size ranging from 0.1 to 10 microns.

10. The reaction vessel of claim 1 wherein said internal filter element comprises an active filtering area ranging from 100 to 1000 sq. ft.

11. A reaction vessel for oxidation of ammonia to nitrogen monoxide in the presence of a catalyst which can become dislodged during the oxidation, said reaction vessel comprising:
    a reactor body having a top portion, a bottom portion, and a middle portion, wherein said top and middle portions cooperate to define a cavity where the ammonia is catalytically oxidized to provide the nitrogen monoxide;

an internal filter element disposed within said cavity and comprising a filter medium comprising ceramic, wherein said internal filter element collects the catalyst dislodged during the oxidation;

a filter plate extending across said reactor body dividing said bottom portion from said cavity, wherein said internal filter element is provided on said filter plate and comprises a filter cage, wherein said filter medium is disposed adjacent to said filter cage, and wherein said filter cage defines an interior volume and protrudes upwardly from said filter plate into said cavity.

12. The reaction vessel of claim 11 wherein said internal filter element further comprises a filter base and a mounting gasket, wherein said filter base connects said filter cage to said filter plate, and wherein said mounting gasket is disposed between said filter plate and said filter base.

13. A method of oxidizing ammonia to nitrogen monoxide in the presence of a catalyst which can become dislodged during the oxidation, said method comprising:

providing a reaction vessel comprising a reactor body, wherein the reactor body comprises a top portion, a bottom portion, and a middle portion, and wherein the top and middle portions cooperate to define a cavity;

providing an internal filter element within the cavity;

oxidizing ammonia in the presence of a catalyst in the cavity to form nitrogen monoxide;

internally filtering the catalyst dislodged during the step of oxidizing ammonia with the internal filter element; and collecting the dislodged catalyst from the internal filter element;

disconnecting the bottom portion of the reactor body from the middle portion of the reactor body; and lowering the bottom portion of the reactor body to a height sufficient to remove the internal filter element from the cavity, wherein said step of collecting the dislodged catalyst from the internal filter element is performed after said step of lowering the bottom portion of the reactor body.

* * * * *